US010760759B2

(12) United States Patent
Dinant et al.

(10) Patent No.: US 10,760,759 B2
(45) Date of Patent: Sep. 1, 2020

(54) ONE-PIECE LENS WITH DRIVEN WHEEL SECTOR

(71) Applicant: VALEO VISION BELGIQUE, Meslin l'Eveque (BE)

(72) Inventors: Franck Dinant, Meslin l'Eveque (BE); Dirkie Sacchet, Meslin l'Eveque (BE); Florestan Debert, Meslin l'Eveque (BE)

(73) Assignee: VALEO VISION BELGIQUE, Meslin l'Eveque (BE)

( * ) Notice: Subject to any disclaimer, the term of this patent is extended or adjusted under 35 U.S.C. 154(b) by 106 days.

(21) Appl. No.: 15/634,636

(22) Filed: Jun. 27, 2017

(65) Prior Publication Data

US 2017/0370548 A1    Dec. 28, 2017

(30) Foreign Application Priority Data

Jun. 28, 2016    (FR) ..................................... 16 56011

(51) Int. Cl.
| | |
|---|---|
| *F21S 41/63* | (2018.01) |
| *F21S 41/55* | (2018.01) |
| *F21S 41/29* | (2018.01) |
| *B60Q 1/068* | (2006.01) |
| *F21S 45/50* | (2018.01) |
| *F21S 41/143* | (2018.01) |
| *F21S 41/255* | (2018.01) |

(52) U.S. Cl.
CPC .......... *F21S 41/635* (2018.01); *B60Q 1/0683* (2013.01); *F21S 41/295* (2018.01); *F21S 41/55* (2018.01); *F21S 41/143* (2018.01); *F21S 41/255* (2018.01); *F21S 45/50* (2018.01)

(58) Field of Classification Search
CPC ............................... B60Q 1/068; B60Q 1/124
See application file for complete search history.

(56) References Cited

U.S. PATENT DOCUMENTS

| | | | | |
|---|---|---|---|---|
| 4,930,367 A | * | 6/1990 | Nagasawa ............ | B60Q 1/0683 74/416 |
| 2015/0085511 A1 | * | 3/2015 | Shibata ................ | B60Q 1/0683 362/512 |

(Continued)

FOREIGN PATENT DOCUMENTS

| | | |
|---|---|---|
| EP | 1 234 716 A2 | 8/2002 |
| EP | 3 021 042 A1 | 5/2016 |

(Continued)

OTHER PUBLICATIONS

French Preliminary Search Report dated Jan. 27, 2017 in French Application 16 56011 filed on Jun. 28, 2016 (with English Translation of Categories of Cited Documents).

*Primary Examiner* — Alexander K Garlen
*Assistant Examiner* — Eric T Eide
(74) *Attorney, Agent, or Firm* — Oblon, McClelland, Maier & Neustadt, L.L.P.

(57) ABSTRACT

The present invention relates to a vehicle lighting device including a lens intended to deflect the light rays emitted by a light source and including a wheel sector with a driven surface. The wheel sector is made in one piece with the lens as a whole. Also included is a driving means with a driving surface such that the driving surface is in contact with the driven surface, and movement of the driving surface drives movement of the lens.

14 Claims, 5 Drawing Sheets

(56) References Cited

U.S. PATENT DOCUMENTS

| | | | |
|---|---|---|---|
| 2015/0197179 A1* | 7/2015 | King | F16H 35/10 |
| | | | 362/460 |
| 2016/0084470 A1* | 3/2016 | Abe | F21S 41/143 |
| | | | 362/549 |
| 2016/0137122 A1 | 5/2016 | Oshima et al. | |
| 2016/0339834 A1 | 11/2016 | Oshima et al. | |
| 2017/0106782 A1* | 4/2017 | Zhang | B60Q 1/0683 |
| 2018/0118093 A1* | 5/2018 | Yamazumi | F21S 41/148 |

FOREIGN PATENT DOCUMENTS

| | | | | |
|---|---|---|---|---|
| FR | 3 026 462 A1 | 4/2016 | | |
| WO | WO-2014012878 A1 * | 1/2014 | | F21S 41/143 |
| WO | WO 2015/115319 A1 | 8/2015 | | |

* cited by examiner

ONE-PIECE LENS WITH DRIVEN WHEEL SECTOR

The present invention concerns a vehicle lighting device comprising an adjustable optical component. It more particularly concerns a vehicle lighting device comprising a lens driven in movement by a mechanical component.

In devices comprising an optical component, such as a lens, one solution used for adjusting that component is to use an adjuster screw, notably a lead screw.

An example of a device of this kind is disclosed in WO2014012878, in which ribbed forks cooperate with an adjuster screw. The latter are made in one piece with the lens as a whole. An accurate adjustment and a compact arrangement are obtained. However, it is difficult to mount the fork on the adjuster screw.

An objective of the invention is to improve the robustness between the driving means and the lens at the same time as remaining compact and accurate.

Thus the present invention consists in a vehicle lighting device comprising:
- a lens intended to deflect the light rays emitted by a light source and comprising a wheel sector with a driven surface, the wheel sector being made in one piece with the lens as a whole,
- a driving means with a driving surface such that the driving surface is in contact with the driven surface and movement of the driving surface drives movement of the lens.

The use of a wheel sector therefore enables positioning of the wheel sector relative to the driving means more easily and more robustly. It also enables the lens to be produced in one piece, thus making it possible to improve its compactness and accuracy.

The lighting device according to the invention may optionally have one or more of the following features:
- the driven surface comprises raised patterns meshing with raised patterns of the driving surface; this enables optimization of the transmission of movement between the driving surface and the driven surface;
- the wheel sector is a toothed wheel sector, the raised patterns of the driven surface being teeth; this is a simple and effective shape for optimizing the transmission of movement between the driving surface and the driven surface;
- the movement of the lens is a movement of rotation about a rotation axis, the wheel sector being centered on the rotation axis of the lens; this enables rotation with lower forces on the driving means;
- the lens comprises an optical part and two mobile articulation parts, the optical part comprising a front diopter and a rear diopter adapted to deflect the light rays from a light source of the device, the mobile articulation parts being arranged on opposite sides of the optical part; the lens can therefore be mounted with firm retention of the optical part at the same time as leaving it free to rotate via its mobile articulation parts;
- the rotation axis passes through each of the mobile articulations;
- the lens is formed in one piece from a transparent or translucent material, notably polymethyl methacrylate (PMMA); these materials can be fragile if deformed; however the wheel sector embodiment is a relatively strong shape, which makes it possible to make the wheel sector from the material of the lens whilst preserving a good strength of the wheel sector in the long term; in particular, PMMA is especially beneficial for forming the optical part given its transparency and optical properties; however, PMMA is more subject to creep than other plastic materials, for example the polyoxymethylene used to produce an adjuster screw; the wheel, notably toothed wheel, sector shape is particularly resistant to creep, however; producing the lens in PMMA therefore enables the use of a material of good optical performance both for the optical part and for the wheel sector whilst resisting creep and therefore with an extended service life;
- the wheel sector forms an arm extending lengthwise between a first end connected to the lens and a free second end, the latter carrying the driven surface; this enables the overall size of the wheel sector to be minimized whilst also increasing the movement demultiplication, which also makes it possible to render the adjustment more accurate at the level of the driving means;
- the arm is globally flat and comprises two extended surfaces separated by an edge surface, the edge surface comprising the driven surface at the second end; this is a shape that is easier to produce, notably by a molding process;
- the wheel sector comprises a cylinder portion and teeth on the edge surface of the cylinder portion thereby forming the driven surface, notably a cylinder portion having an axis parallel to or coinciding with the rotation axis of the lens, notably having an axis parallel to or coinciding with the rotation axis of the lens;
- according to the preceding paragraph, the driven surface may carry helicoidal teeth; in this case the driven surface is circumscribed in a cylinder portion; the helicoidal teeth enable sufficient meshing with other helicoidal teeth or an adjuster screw;
- the driving means is an adjuster screw comprising a threaded portion with a thread forming the driving surface; this enables simple adjustment of the light beam with good demultiplication;
- the adjuster screw extends along a longitudinal axis and comprises a carrier portion, said carrier portion being situated on one side of the threaded portion along the longitudinal axis, said device further comprising:
  a wall cooperating with the adjuster screw,
  one or more elastic means arranged between said carrier portion and said cooperating wall and adapted to be compressed in a direction transverse to the longitudinal axis of the adjuster screw,
the lens, the cooperating wall and the elastic means being such that the elastic means or at least one of the elastic means is loaded to exert a return force urging the threaded portion toward the lens; the threaded portion therefore bears continuously against the lens, thus preventing any play between the threaded portion and the lens;
- the wheel sector forms an arm, the force returning the threaded portion toward the lens being aligned with the direction in which this arm extends; this reinforces the taking up of play between the driven surface and the driving surface;
- the carrier portion forms one of the ends of the adjuster screw; this renders the return effect of urging it toward the adjustable part more effective and simplifies its production, notably by a molding process;
- the elastic means are leaf springs; this is a simple embodiment of the elastic means;
- the device comprises a casing inside which the lens and the adjuster screw are housed;
- the casing comprises;

a front housing closed at the front by a closing outer lens, the lens being mounted inside this front housing, a cassette with the threaded portion inside it, a sleeve connecting the front housing and the cassette, the wheel sector forming an arm extending lengthwise through the sleeve into the cassette, where the driven surface is in contact with the driving surface;

this enables the lens to be mounted by sliding it toward the cassette, the sleeve forming a means for guiding the wheel sector toward the adjuster screw;

the cassette has an interior wall formed by a cylinder portion of a given diameter, the sleeve having an inside width in a transverse direction less than this given diameter and greater than the thickness of the wheel sector; this improves the guidance of the driven surface toward the threaded portion;

the sleeve opens into the cassette via an opening delimited by a chamfer oriented toward the interior of the sleeve; this facilitates the engagement of the wheel sector in the sleeve;

the wheel sector is a conical wheel sector, notably having an axis parallel to or coinciding with the rotation axis of the lens, the driving means is a conical wheel having an axis at an angle to the axis of the conical wheel sector, in particular these two axes are concurrent, they notably form between them an angle of 90°, the conical wheel notably forming a drive gear; this makes it possible to produce direct transmission with no adjuster screw;

the wheel sector forms an arm having an elasticity in a direction parallel to the axis of the conical wheel, the arm and the conical wheel being such that the arm is loaded so as to exert a return force urging the driven surface toward the driving surface; this therefore enables any play between the conical wheel and the lens to be taken up;

the device also comprises:

a pressing assembly comprising an armature and a contact portion carried by the armature, the armature surrounding the lens at least partly, said contact portion bearing against the lens, the lens, the driving means and the pressing member being such that the lens is at least partially clamped between the adjuster screw and the contact portion and in a direction going from the adjuster screw towards the contact portion, termed the flexing direction, the contact portion is rigid and the armature is elastically deformable; this enables production of a means of absorbing the force when the lens comes into contact with its abutment;

the wheel sector forms an arm extending lengthwise, its length being aligned with said flexing direction; the force on the driving means is therefore transmitted directly to the armature, thus favoring greater absorption of the force on the armature;

the armature is prestressed when mounted in the casing so as to generate a return force on the adjuster screw urging it in the direction opposite to the flexing direction; this therefore increases the pressure against the adjuster screw;

the lighting device comprises a support for the lens, this support being a heat dissipater, notably a heatsink; this improves compactness by enabling evacuation of the heat generated by the light source;

the armature is made of polycarbonate; this enables good flexibility thereof;

the lighting device comprises the light source; in this case the lighting device is ready to emit a light beam as soon as it is supplied with electricity;

the light source is a light-emitting diode (LED); the present invention is particularly useful in the context of a lighting device employing a light-emitting diode; in fact as the latter is of very small size compared to conventional lamp filaments, play and inaccuracies have a greater impact;

the lens lies directly against the pressing member on one side and/or against the driving means on the other side;

the lens is adapted to deflect the light rays so as to form a lighting beam with a cut-off line; the accuracy of the device according to the invention is all the more useful in this case because the cut-off line must be positioned accurately so as to not to dazzle the drivers of vehicles approaching in the opposite direction or being followed by a vehicle equipped with a lighting device according to the invention;

the lighting device is a fog lamp, the lens notably being adapted to deflect the light rays so as to form a fog beam having a horizontal cut-off line.

The invention also consists in a vehicle comprising a lighting device according to the invention.

Unless otherwise indicated, when they are used with regard to the arrangement of the lighting device, the terms "front", "rear", "lower", "upper", "side", "longitudinal", "transverse" are relative to the direction of emission of light from the lighting device.

Figure 1:
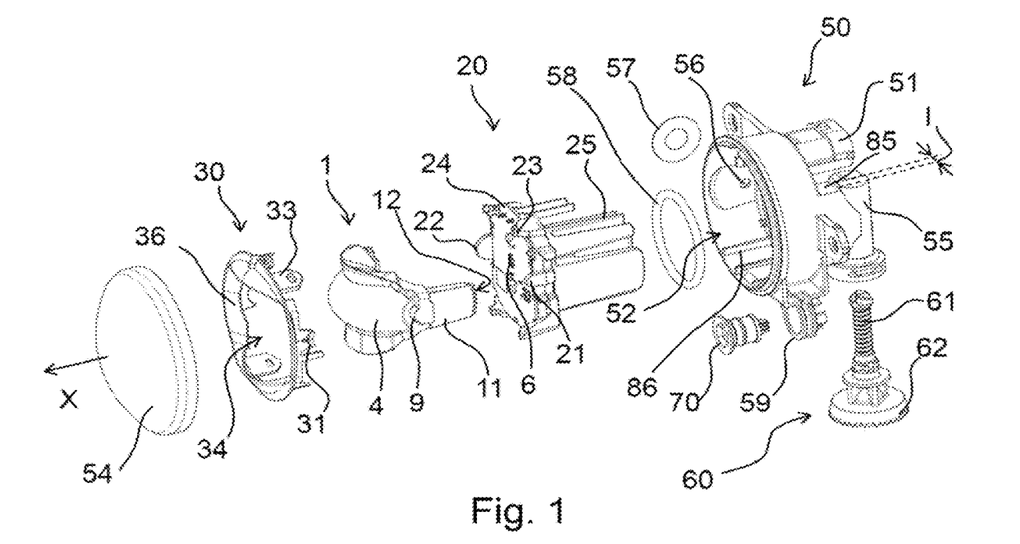
FIG. 1 is an exploded perspective view of a lighting device according to a first embodiment of the invention.
Figure 2:
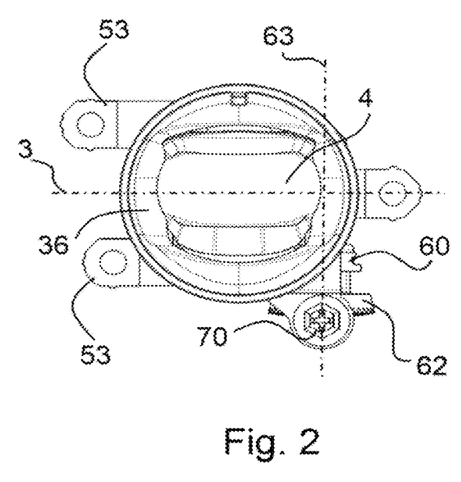
FIG. 2 is a front view of the lighting device from FIG. 1, shown when assembled.

Other features and advantages of the invention will become apparent on reading the detailed description of nonlimiting embodiments thereof given hereinafter, to understand which see the appended drawings, in which:

FIGS. 1 and 2 show a first embodiment of a vehicle lighting device according to the invention.

This lighting device comprises a casing 50 defining a housing 52 inside which are disposed a light source 6 and a lens 1 deflecting the rays emitted by this light source 6. The lighting device may conventionally comprise a closing outer lens 54 and a styling component or mask 30, situated between the closing outer lens 54 and the lens 1 in the direction X of emission of the light beam by the lighting device.

The casing 50 comprises a part forming a substantially cylindrical envelope defining the housing 52. The casing may comprise fixing lugs 53 intended to be fixed to the vehicle.

The lighting device enables the emission of a light beam that is truncated or at least features a very rapid falling off of the emitted luminosity below a certain level, the edge of the truncated part or this very rapid reduction corresponding to a cut-off line. For example the beam is confined below a plane, notably intended to be substantially horizontal and at a certain height above the carriageway once the device has been mounted in the vehicle.

In the example shown, the device is a fog lamp generating a fog beam which therefore features a horizontal cut-off line; this lamp is also known as a front foglamp or foglight.

This device is configured to allow adjustment of the position of the cut-off line of the beam in a given direction, notably intended to be vertical.

In the example shown the lens 1 has an optical part, referred to hereinafter as the deflection part 4 and delimited by a rear diopter and a front diopter.

The front and rear diopters of the deflection part 4 are adapted to deflect the light rays to form the light beam with the cut-off line. According to an embodiment that is not shown, there may equally well be front and/or rear diopters bearing striations adapted to deflect the light rays so as to form the cut-off line.

The position of the cut-off line is adjusted by variation of the angular position of the lens 1 about a pivot axis, in this example a rotation axis 3, by the actuation, also in this example, of an adjuster screw 60 with a threaded portion 61.

This rotation axis 3 is intended to be oriented along the transverse axis of the vehicle equipped with the lighting device.

Figure 3:
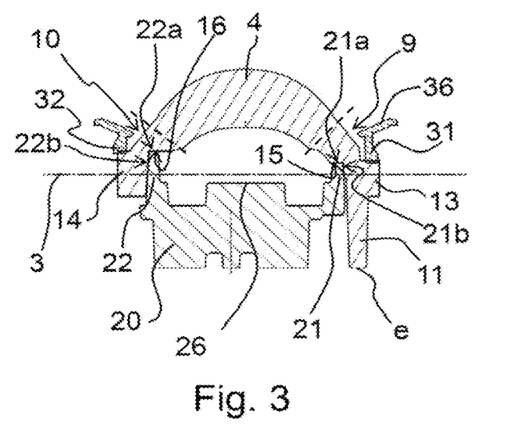
FIG. 3 is a view in cross section of the lighting device from FIG. 2 on a plane perpendicular to FIG. 2 and passing through the axis 3.

In this example, to allow this adjustment, the lens 1 also comprises two mobile articulation parts 9 and 10 on opposite sides of the deflection part 4 about which it is able to turn. In FIG. 3 these mobile articulation parts 9 and 10 are diagrammatically separated from the deflection part 4 by the dashed lines.

The lens 1 also comprises a toothed part 11 cooperating with the adjuster screw 60, rotation of which about the longitudinal axis 63 of this screw drives upward or downward pivoting of the lens 1. In other words, the adjuster screw 60 forms one embodiment of a means for driving the lens 1.

The adjustment of the cut-off line is therefore effected by actuation of a single member, namely the lens 1, used to form and to transmit the beam.

In this example, according to one principle of the invention, the toothed part forms a wheel sector 11 with a surface driven by the adjuster screw 60, this wheel sector 11 being made in one piece with the lens as a whole, notably with the deflection part 4.

In this example, the wheel sector is more particularly a toothed wheel sector 11.

In this example, the teeth 12' of the toothed wheel sector 11 form the driven surface 12. The thread 61' of the threaded portion 61 forms the driving surface which drives this driven surface and therefore the toothed wheel sector 11 and therefore directly drives the lens 1.

Figure 8:
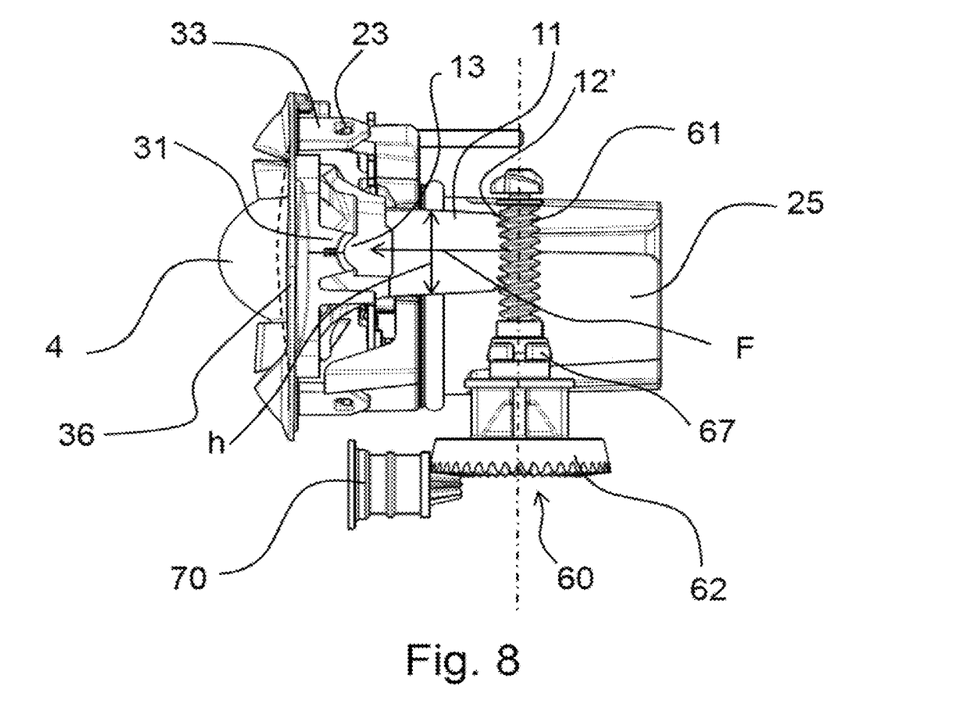
FIG. 8 is a side view of the lighting device form FIG. 2 without the closing outer lens and without the casing.
Figure 9:
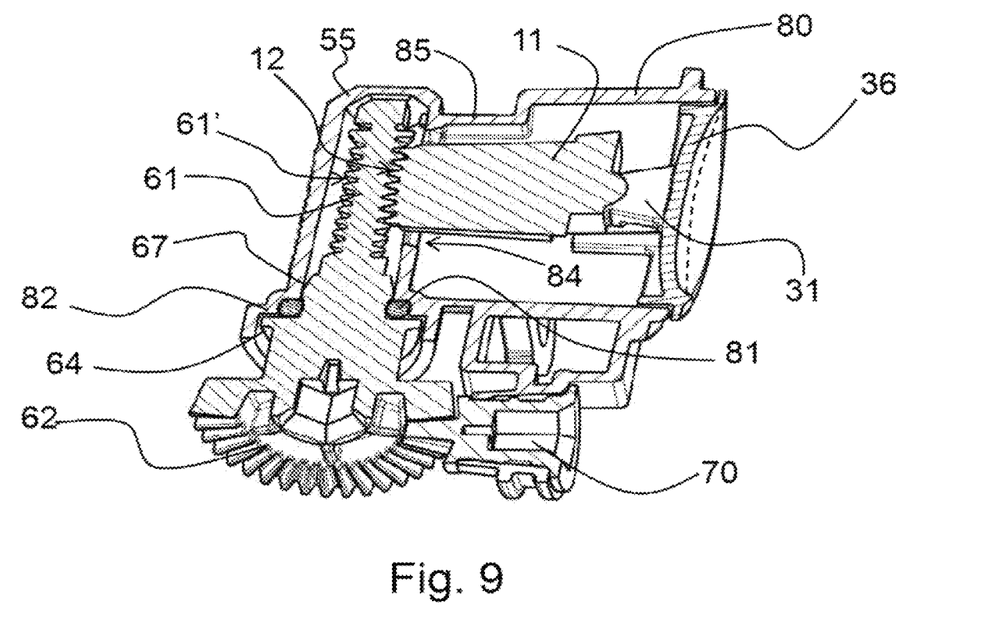
FIG. 9 is a sectional perspective view of the lighting device from FIG. 2 on a plane perpendicular to the axis 3 and containing the axis 63 but without the closing outer lens.

The toothed wheel sector 11 therefore meshes with the threaded portion 61, as can be seen in FIGS. 8 and 9.

The teeth 12' can be straight, the toothed wheel sector then being a cylindrical portion consisting of a cylinder portion carrying straight teeth.

Alternatively, the teeth 12' form helicoidal teeth. In other words, the toothed wheel sector 11 comprises a portion of a cylinder carrying these teeth, the latter having an inclination and a curvature corresponding to a thread portion.

According to one embodiment of the invention, the lens 1 is a one-piece component. The deflection part 4 and the mobile articulation parts 9, 10 and the toothed wheel sector 11 are therefore made of the same material in this case, and are notably made in one piece.

In particular, this lens 1 is made of PMMA and therefore offers good optical performance and its toothed wheel sector 11 is highly resistant to creep, therefore being able to undergo numerous adjustments without significant deformation.

Here the toothed wheel sector 11 is formed by a strip with a first end connected to the first mobile articulation part 9 and a second end carrying the teeth 12' of this toothed wheel sector, thus forming an arm extending lengthwise from the rear to the front of the device, i.e. from the teeth 12' to the first mobile articulation part 9.

In this example, the height h of this strip enables some movement of the lens 1.

The largest faces of this arm are disposed approximately vertically, FIG. 8 showing one of them. These faces are separated at the rear by the driven surface 12 and at the top and at the bottom by a lower edge surface and an upper edge surface.

The width of these edge surfaces corresponds to the thickness e of the toothed wheel sector 11.

In this example the light source 6 is a light-emitting diode placed on the upstream side of the lens 1 relative to the direction of emission of the light rays.

The lighting device comprises a support 20 supporting both this light source 6 and the lens 1. This support is fixed directly to the casing 50. It positions and therefore directly fixes the source 6 in the casing 50 relative to the lens.

Here the cut-off line is produced by a mutual arrangement of the lens 1, notably its front and rear diopters, and the light source 6, as is known in itself, notably from the documents EP1762776, in particular the embodiments corresponding to FIG. 11 and the subsequent figures, and/or EP1970619, in particular the FIG. 1 embodiment.

According to this example, the rotation axis 3 passes substantially through the light source 6. The lens 1 may furthermore have a focus at the level of the light source 6. This produces a beam the shape of which and the distribution of the luminous intensities in which do not vary as a function of the angular position of the lens 1 and therefore are not dependent on the position of the cut-off line.

In this example the light source is a light-emitting diode (LED) 6.

Depending on the direction of rotation of the adjuster screw 60, the toothed wheel sector 11 tilts upward or downward, driving the adjustment of the deflection part 4 respectively downward or upward.

This moves the projected image of the LED 6 and therefore the corresponding light beam. In particular, in the context of a fog beam, the height of its cut-off line can be adjusted.

Figure 4:
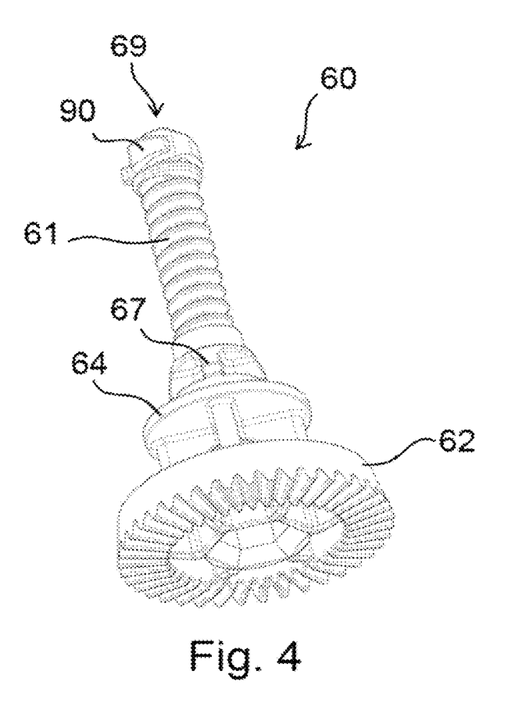
FIG. 4 is a perspective bottom view of an adjuster screw in accordance with one embodiment of the invention, notably the adjuster screw of the device from FIG. 1.
Figure 5:
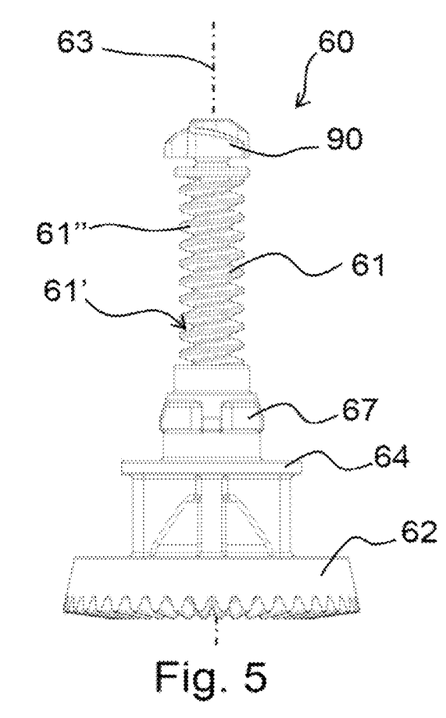
FIG. 5 is a side view of the adjuster screw from FIG. 4.
Figure 6:
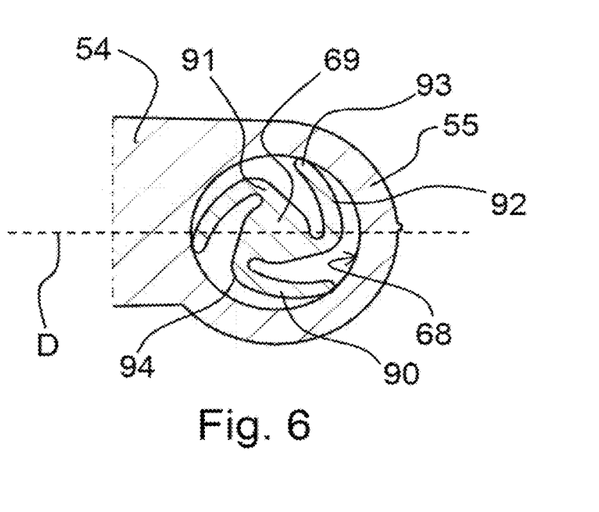
FIG. 6 is a sectional view of the adjuster screw perpendicular to its longitudinal axis and at the level of the elastic means.

FIGS. 4 to 6 show the adjuster screw 60 of the lighting device shown in FIGS. 1 to 3 and 8 to 10.

The adjuster screw 60 extends along a longitudinal axis about which it is driven in rotation. It comprises in succession along this longitudinal axis 63 a first end formed by an adjuster wheel 62, a rotation bearing 64, clips 67, the threaded portion 61, and a second end in the form of a carrier portion 69 carrying leaf springs 90. Here the leaf springs 90 form the elastic means of the adjuster screw.

The threaded portion carries the thread 61" the surface of which forms the driving surface 61' of the teeth 12' of the toothed wheel sector 11.

Here the adjuster wheel 62 forms the means for actuation of rotation of the adjuster screw 60 in either direction.

As can be seen better in FIG. 6, the leaf springs 90 are adapted to be flexible and elastically deformable toward the carrier portion 69. Here the flexibility is conferred by their particular shape. This is not limiting on the invention, however.

Here, thanks to their shape and their position, these leaf springs 90 can be compressed transversely relative to the longitudinal axis 63 of the adjuster screw 60.

Each of these leaf springs 90 has a first end and a second end. The first end of each leaf spring is formed by a base 91 that extends radially from the carrier portion 69. The second end is a free end 93, here formed by a rounded termination.

The leaf spring 90 has a bend 94 between the base 91 and a flexing portion 92 of the leaf spring situated between this bend 94 and the free end 93. The flexing portion 92 of each leaf spring has a curvature such that the free ends 93 of all the leaf springs 90 can be circumscribed in a circle with its center on the longitudinal axis 63 of the adjuster screw 60. In other words, all the free ends 93 pass through one and the same circle.

Moreover, this curvature of the flexing portions of the leaf springs 90 is such that at the level of the free ends 93 the curvature of each leaf spring 90 is tangential to that circumscribed circle. When the carrier portion 69 is inserted in the housing provided for the adjuster screw 61, namely here a cassette 55 of the casing 50, that housing having a cylindrical shape, the leaf springs 90 will therefore be approximately tangential to the interior wall of this cassette 55. This facilitates the sliding of the leaf springs 90 against the internal wall of the cassette 55, as can be seen in FIG. 6, for example.

Moreover, this curved shape of the leaf springs 90 enables easier and more flexible deformation thereof.

To favor the rotation of the adjuster screw 60 in the cassette 55 the free ends 93 have a rounded shape, notably the shape of a circular cylinder portion with its axis parallel to the longitudinal axis 63 of the adjuster screw 60.

As shown in FIGS. 4 and 5, when the adjuster screw 60 is demounted from the lighting device, the leaf springs 90 are no longer compressed and are moved away from the carrier portion 69 so that the circumscribed circle at the free ends 93 of these leaf springs has a diameter greater than the diameter of the threaded portion 61, inclusive of the thread.

In FIG. 6, for example, the free end 93 of each leaf spring each 90 includes the point at the greatest radial distance from the longitudinal axis 63 of the adjuster screw 60. The radial distance of this point from the longitudinal axis 63 is greater than the radius of the threaded portion 61.

In other words, these leaf springs 90 must be compressed in order for it to be possible to insert the adjuster screw 60 in a sleeve the diameter of which approximately corresponds to the diameter of the thread of the threaded portion 61.

In this example the diameter of the interior wall of the cassette 55 is less than that of this circumscribed circle. Because of this, these leaf springs are prestressed when the adjuster screw 60 is mounted in the cassette 55.

As can be seen in FIG. 5, the upper end of the adjuster screw 60 is approximately conical, thus facilitating its insertion in the cassette 55.

The adjuster screw 60 may be made in one piece, for example from polyoxymethylene.

As shown in FIGS. 1 and 9 in particular, the housing 52 can be delimited by a cylindrical wall 80 of the casing 50 on which the closing outer lens 54 is mounted. The housing 52 is delimited at the front by this closing outer lens 54 and at the rear by a rear wall of the casing 50.

In a manner that is not limiting on the invention, this casing 50 features a sleeve 85 extending from the rear wall of the casing and opening into the cassette 55 housing the adjuster screw 60. This sleeve 85 thus connects the housing 52 and the cassette 55.

The adjuster screw 60 is arranged in the cassette 55 and clipped into the casing 50. The adjuster screw 60 is therefore immobilized against movement in translation in this cassette 55.

As shown here, the clips 67 are for example formed by radial projections relative to the adjuster screw 60 arranged against complementary portions not shown in these figures situated in the vicinity of an opening for inserting the adjuster screw 60 into the cassette 55. These clips 67 therefore make it possible to prevent the adjuster screw 60 from moving downward in translation.

Similarly, in this example, the rotation bearing 64 is arranged against a circular wall 82 of the casing 50 to prevent the adjuster screw 60 from moving upward in translation.

The circular wall 82 delimits the opening for inserting the adjuster screw 60. The edges of this insertion opening, and thus the circular wall 82 at this level, lie between the rotation bearing 64 and these locking lugs 67 so as to press the rotation bearing 64 against the plane exterior face of this circular wall 82. In addition to immobilizing it against movement in translation, this facilitates sealed rotation of the screw in the insertion opening.

Here an annular seal 81 is arranged between the clips 67 and this rotation bearing 64 so as to seal the casing 54 at the level of the insertion opening enabling the adjuster screw 60 to be fitted. This seal 81 can be placed on the adjuster screw 60 beforehand, for example.

In this example, a circular shoulder between the circular wall 82 and the complementary portions receives the seal 81.

Figure 10:
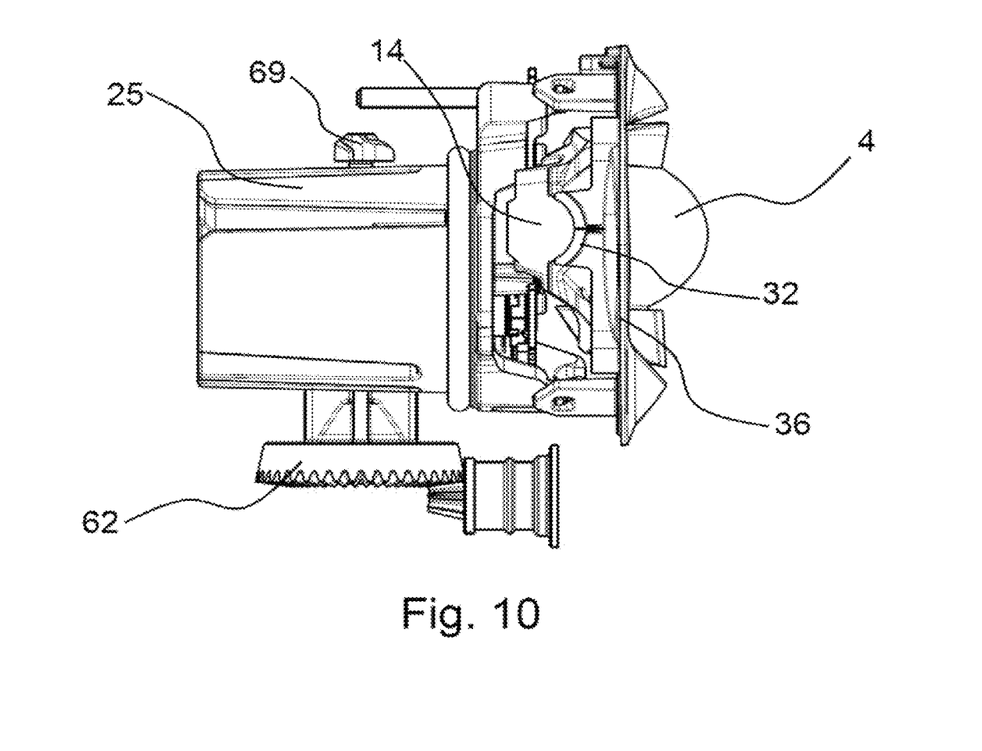
FIG. 10 is a side view from the opposite side compared to FIG. 8 of the lighting device from FIG. 2 without the casing and without the closing outer lens.

The mask 30 forms a pressing member. As shown in FIG. 1, the support 20, the lens 1 and the mask 30 are stacked in that order in the casing 50. This means that the mask 30 is fixed to the support 20 by means of fixing lugs 33 including a hole, hooks 23 of the support clipping into these holes, as can be seen in FIGS. 8 and 10.

Being stacked in this way, the mask 30 presses the lens 1 against its support 20, as described in detail hereinafter.

In this example, the sleeve 85 serves as means for guiding the arm formed by the toothed wheel sector 11 when assembling the device by stacking, as explained hereinafter.

The mask 30 features a central opening 34. Once the fog lamp has been assembled, the mask 30 surrounds the lens 1, its deflection part 4 being accommodated in the central opening 34. From the outside, seen from the front, virtually only this deflection part 4 of the lens 1 and the front face of the mask 30 can be seen.

Here the support 20 further comprises an electronic control circuit card 24. This circuit card 24 is notably used to control the LED 6. Arms 21, 22 of the support 20 extend along the rotation axis 3 on opposite sides of this control circuit card 24.

In this example the support 20 is a heatsink, having fins 25 on the back. This heatsink 20 is more particularly adapted to exchange heat with the LED 6, notably via the electronic circuit card 24.

In this example, to favor the dissipation of heat and the compactness of the lamp, the rear wall of the casing 50 comprises a rear opening, not shown, through which the fins 25 pass. In this case the lamp comprises an annular seal 58 in order to provide a seal between the support 20 and the rear wall of the casing 50.

The heatsink can be made of metal, notably aluminum, or a thermally conductive polymer.

The casing 50 may comprise a ventilation device, such as a ventilation hole 56 through the lateral wall of the casing 50 blocked by a semi-permeable membrane 57. This enables the interior of the casing 50 to communicate with the outside.

The internal face of the casing 50 can comprise elastic nesting ribs for clipping the support 20 into the casing 50 by means complementary to these ribs.

In this example, the back of the casing also comprises a connector 51 for the supply of electrical power to the light source 6.

The casing 50 also features a protuberance forming a ring 59 for retaining a drive gear 70 the longitudinal axis of which is perpendicular to that of the adjuster screw 60. The drive gear 70 cooperates with the teeth of the adjuster wheel 62 so that actuation of the gear 70 drives the rotation of the adjuster wheel 62 and therefore of the adjuster screw about the longitudinal axis 63.

Figure 7:
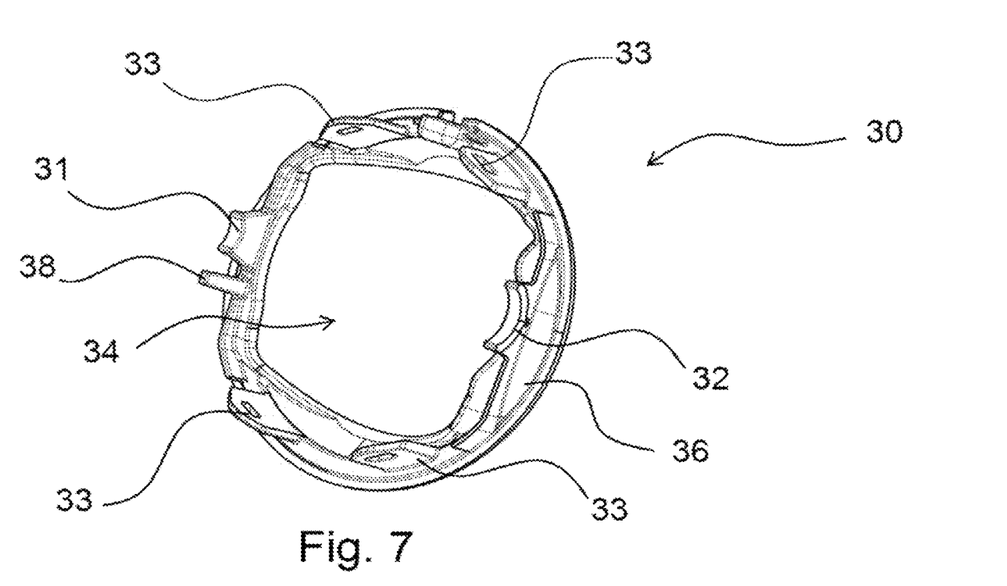
FIG. 7 is a perspective view of the pressing member of the lighting device from the previous figures.

The mask 30, shown in detail in FIG. 7, comprises an armature 36 that forms an embellisher of this mask. In fact, as can be seen in FIG. 2, the front part of the armature 36 forms the part visible from the outside of the lighting device and enables the back of the casing 50 to be masked.

In this example, the embellisher 36 completely surrounds the lens 1 once the lighting device has been assembled.

In this example, the mask 30 comprises two contact portions 31 and 32. Here the latter portions are formed by protuberances extending approximately in the direction of the stack of components inside the casing 50. The contact portions 31, 32 face toward the rear of the armature 36 and so are not visible from the outside. Once the lighting device has been assembled the first contact portion 31 and the second contact portion 32 respectively come into contact with external portions 13 and 14 of the first mobile articulation part 9 and the second mobile articulation part 10.

As shown in FIGS. 1 and 3, the external portion of the first mobile articulation part 9 and the external portion of the second mobile articulation part 10 are formed by a first cylindrical portion 13 and a second cylindrical portion 14.

As shown in FIG. 3, the arms of the support 20 are formed by disk portions 21, 22 each comprising an edge surface 21a, 22a, each edge surface being accommodated in complementary shapes, namely concave portions 15, 16, of the lens 1 situated to the rear thereof.

The contact portions 31, 32 have at the end a concave shape complementary to the cylindrical portions 13, 14.

The first mobile articulation part 9 therefore turns easily between the contact portion 31 and the disk portion 21. Similarly, the second mobile articulation part 10 turns easily between the contact portion 32 and the disk portion 22.

The disk portions 21, 22 and the contact portions 31, 32 on the one hand retain the lens 1 on the support 20 and on the other hand allow it to rotate relative thereto. Here the disk portions 21, 22 and the contact portions 31, 32 therefore form fixed articulation parts between which the mobile articulation parts 9, 10 pivot, thus forming two articulations of the lens.

In this example, the concave portions 15, 16 of the lens are situated between the cylindrical portions 13 and 14 along the rotation axis 3. The armature 36 therefore presses the mobile articulation parts 9, 10 firmly against the support 20.

This offset between the two fixed articulation parts of each articulation, namely the offset along the rotation axis 3 between the corresponding cylindrical portion 13, 14 and the corresponding concave portion 15, 16, enables easier placing of the lens 1 with the toothed wheel sector 11 forming an arm extending toward the rear.

The disk portions 21, 22 have contact faces 21b, 22b transverse to and opposite the light source 6. They form sliding contact bearings each cooperating with a plane face of the corresponding mobile articulation part 9, 10.

In this example these plane faces and these contact faces 21b, 22b are inclined inwards, i.e. toward the space between the articulations of the lens 1. This improves the stacking of the lens 1 with its support 20 in the casing 50, the mobile articulation parts 9, 10 being placed on opposite sides of the cylindrical portions 21 and 22.

As shown in FIG. 3 the support 20 has an offset toward the front so that the circuit card 24 and the LED 6, not shown in this figure, can be positioned with the light-emitting element of the latter aligned with the rotation axis 3.

As shown in FIGS. 8 and 10, the mask is clipped onto the support 20 and the contact portion 31 is in contact with cylindrical part 9 and therefore presses on the latter. The casing 50 is not shown in these FIGS. 8 and 10 to clarify the drawing.

By pressing against the lens 1 the mask 30 not only enables the latter to be pressed against the support 30 but also enables the toothed wheel sector 11 to be pressed against the adjuster screw 60.

Thus in the embodiment shown by way of example in these figures the support 20 and the adjuster screw 60 each and separately form a bearing element against which the lens 1 is pressed.

As can be seen in FIGS. 8 and 9, the arm formed by the toothed wheel sector 11 is arranged between the contact portion 31 and the adjuster screw 60, more particularly its threaded portion 61, in an alignment direction parallel to that of the direction X of emission of the light beam by the lamp.

In this example, the embellisher 36 is flexible and elastically deformable, here on the sides of the mask 30, in a flexing direction F. The dashed lines in FIG. 8 represent the maximum flexed position of the embellisher 36.

In this example this flexing direction F of the embellisher 36 corresponds to the direction of alignment of the contact portion 31, the arm formed by the toothed wheel sector 11 and the adjuster screw 60.

When the adjuster screw 60 is actuated, the lens 1 pivots up to a certain limit, for example until it abuts against the support 30. In a situation of this kind the toothed wheel sector 11 applies a force to the adjuster screw 60. The arrangement of the toothed wheel sector 11 enables the transfer of this force on the adjuster screw 60 to the contact portions 31, 32 which, being rigid, drive the deformation of the embellisher 36 in the flexing direction F. The teeth of the toothed wheel sector 11 are therefore progressively disengaged from the threaded portion 61 until they reach the maximum flexed position, in which the teeth 12' of the toothed wheel sector 11 are completely disengaged from the threaded portion 61. The lens 1 is then uncoupled from the adjuster screw 60.

As soon as the lens is uncoupled, the elasticity of the embellisher 36 drives the lens 1 and therefore the toothed wheel sector 11 rearwards, bringing the toothed wheel sector 11 back into meshing interengagement with the threaded portion 61.

The mask 30 can be mounted in the casing 50 so as to be slightly prestressed against the lens. Here the interference between the diameter of the thread of the threaded portion 61 and the toothed wheel sector 11 is 3.5 mm. Thus in this lamp there can be a forward movement of 3 or 5 mm of the toothed wheel sector 11 before it is uncoupled.

By interference between two parts mounted together is meant that those parts have been moved closer together than they would be with no deformation. The distance between their mounting position in contact with no deformation and the mounted position with deformation corresponds to the value of the interference.

In this example, the flexibility of the leaf springs 90 of the adjuster screw serves to take up play at the level of the articulation of the lens 1.

In fact, if there is any play between the mobile articulation parts 9, 10 and the disk portions 21, 22 and the contact portions 31, 32 the flexibility of the leaf springs 90 makes it possible to compensate any offset.

According to one embodiment of the invention and notably in this example the mask 30, the lens 1 and the support 20 are mounted together so that the contact portions 31, 32 interfere with the cylindrical portions 13, 14 over a distance of 0.2 mm in the flexing direction F.

In other words, once the lighting device has been assembled, the leaf spring or springs 90 in contact with the cooperating wall 68, and therefore with the rear end of the adjuster screw, will be compressed so as to move toward the longitudinal axis 63 of the adjuster screw 60 by a distance of approximately 0.2 mm. The leaf spring or springs 90 are therefore prestressed, which moreover makes it possible to take up play.

Moreover, the rear leaf springs 90 being prestressed more than the one situated at the front, they therefore exert a return force urging the threaded portion 61 toward the toothed wheel sector 11.

When as shown in FIG. 10 the armature 36 bears via the contact portion 31 on the toothed wheel sector 11, the latter therefore bears on the adjuster screw 60 and therefore pushes it slightly toward the rear of the lighting device, also driving the carrier portion 69 toward the rear and compressing the leaf springs 90 situated at the rear of the adjuster screw 60. In FIG. 6, in which the carrier portion 69 is shown inside the cassette 55, this relates to the two leaf springs with the free end 93 situated to the rear of the longitudinal axis 63, i.e. the leaf springs situated on the right in FIG. 6. Because of the pressing action of the mask 30, the rearmost leaf spring is the most deformed one, because it is transverse to the direction D of movement of the carrier portion 69.

Here there are three leaf springs 90 which means that, whatever the orientation of the adjuster screw 60 resulting from positioning the lens 1, there will always be at least one leaf spring 90 pressed against the cooperating portion 68. Moreover, each leaf spring extends from its base 91 to its free end 93 almost as far as the base of the next leaf spring. As the adjuster screw 60 turns, a leaf spring 90 therefore slides against the cooperating portion 68 and its compression gradually decreases as it moves away from the direction D of movement and toward the front of the cassette 55. In parallel with this, the preceding leaf spring in the rotation direction is increasingly compressed because it assumes an increasingly transverse orientation relative to the direction D of movement and moves to the rear of the cassette 55. The load is therefore transferred from leaf spring to leaf spring as the adjuster screw 60 rotates.

The overall load on the adjuster screw 60 is therefore continuous. This load remains constant, being distributed continuously and progressively from one leaf spring to the other. Here the return force urging the threaded portion 61 toward the toothed wheel sector 11 is therefore constant.

Here the leaf springs have identical shapes, which facilitates a uniform distribution of the force the carrier portion 69 exerts against the cooperating wall 68.

Moreover, there is always one leaf spring 90 aligned with the carrier portion 69 and the arm formed by the toothed wheel sector 11, the carrier portion 69 lying between this leaf spring 90 and the toothed wheel sector 11.

In the example shown, the contact portions 31, 32, the cylindrical portions 13, 14 and the disk portions 21, 22 are smaller on one side of the lamp, here on the side of the toothed wheel sector 11, than on the other side of the lamp. This enables the provision of poka yokes to position the mask 30 the correct way round with respect to the lens 1 and likewise the lens 1 on the support 20.

As here, the mask 30 can also comprise a pin 38 projecting from the rear of the embellisher 36 and extending longitudinally in the direction of the back of the casing. This pin 38 and the support 20 are such that the pin 38 can move alongside the support only if the lens 1 is correctly placed on the support 20.

As shown in FIG. 9, the arm carrying the toothed wheel sector 11 passes through the sleeve 85 and enters the cassette 55 through an opening 84.

The lamp can be assembled in the following manner.

Firstly:
the adjuster screw 60 is clipped into the adjuster cassette 55 via the insertion opening;
the lens 1 is mounted on its support 20 and the mask 30 is clipped to the support and around the lens 1, thus pressing the lens 1 against the support 20.

Secondly, the mask/lens/support assembly slides into the casing 50 and the toothed wheel sector 11 passes through the opening 84 in the partition that separates the sleeve 85 from the cassette 55.

According to one embodiment of the invention, and as in the example shown here, the mask 30 and/or the support 20 together with the casing 50 are adapted to guide the positioning of the mask/lens/support assembly in the casing 50. In particular, guide rails 86 guide the sliding of the support 20 in the casing 50 to facilitate the passage of the toothed wheel sector 11 through the opening in the partition separating the cassette 55 from the sleeve 85 and the meshing interengagement with the adjuster screw 60.

In the example shown, in order to facilitate the positioning of the mask/lens/support assembly in the casing 50, the sleeve 85 is adapted to form a means for guiding the arm forming the toothed wheel sector 11. In fact, as can be seen in FIGS. 1 and 9, this sleeve 85 has a height enabling it to accommodate the arm forming the toothed wheel sector 11 and the movement of the latter.

In order to guide this arm, the sleeve 85 has an internal width "l" corresponding to the transverse distance between its internal walls. This internal width "l" is greater than the thickness "e" of the toothed sector 11 but less than the diameter of the internal wall of the cassette 55.

Because of this, the sleeve 85 provides longitudinal and vertical guidance of the arm forming the toothed wheel sector 11.

When the mask/lens/support assembly slides in the housing 50 the end of the toothed wheel sector carrying the teeth 12 therefore slides in this sleeve 85 as far as an opening 84 through which it enters the cassette and mesh with the thread 61' of the toothed wheel portion 61. In fact, the threaded portion 61 faces this opening 84.

To facilitate the passage of the toothed wheel sector 11 through the opening 84 during assembly, this opening 84 has chamfered edges formed by the edge surface of the wall separating the cassette 55 from the sleeve 85. These edges are oriented toward the interior of the housing 82 and therefore define a funnel shape for guiding the toothed wheel sector 11 as far as the threaded portion 61.

The drive gear 70 can then be mounted in the retaining ring 59 and the lamp closed by the closing outer lens 54.

In this example, the compression of the leaf springs 90 makes it possible to absorb any differences in the offsets of the positions of the various components of the lighting device. This is particularly advantageous in the example shown here, in which the various components are stacked from the front toward the back of the casing 50.

In the embodiment shown here, the prestressing of the armature 36 by virtue of its deformation in the flexing direction F once mounted in the lighting device is greater than the stiffness of the fins 90 in the flexing direction F, which is parallel to the direction D of movement of the carrier portion 69. Because of this, the prestressing of the armature 36 leads to prestressing of the adjuster screw 60 with the leaf springs at the rear of the adjuster screw stressed more than the leaf spring situated at the front of the adjuster screw.

Moreover, the prestressing of the mask 30 by virtue of the flexibility of the armature 36 means that there is no variation in the compression and the flexibility of the armature 36 when the adjuster screw 60 turns on itself without locking. There is therefore little impact on the position of the lens 1.

Moreover, once the lighting device has been assembled, the flexing of the armature 36 and the leaf springs 90 being in equilibrium, in the event of locking of the adjuster screw the stress will affect the flexibility of the mask 30 more and lead to disengagement of the toothed wheel sector 11.

In the example shown here, the leaf springs 90 can have a shape and a certain flexibility in order to be deformed toward the carrier portion 69 by 2 mm but to require a much greater force to deform more than this.

In fact, as shown in FIG. 6, the free end 93 of the leaf spring 90 initially moves relatively easily toward the carrier portion 69 because of the relatively small flexing of the flexing portion 92 relative to the base 91. On the other hand, much more flexing is required to compress this leaf spring more than this.

In this example, when the adjuster screw 60 is not mounted in the casing 50 the circle circumscribing the free ends 93 has a diameter greater than that of the internal wall of the cassette 55. The leaf springs 90 are therefore prestressed when the adjuster screw is mounted in the casing. This prestressing is notably such that once the device has been assembled all the leaf springs 90 are pressed against the internal wall of the cassette 55, including those at the front, namely those between the lens 1 and the carrier portion 69, as shown in FIG. 6.

Generally speaking, the adjuster screw itself therefore makes it possible to take up any play in the assembled device, notably the lighting device, and thus enables the adjuster screw and the adjustable component to be kept in mesh.

Moreover, according to one embodiment, the adjuster screw also enables cooperation with a pressing member that is itself also deformed by virtue of its flexibility to make it possible to press the adjustable part against the adjuster screw and notably to allow the disengagement of the latter.

Moreover, the fact that the toothed wheel sector 11 and the lens 1 are made in one piece also facilitates transmission of the return force exerted by the leaf springs 90 and/or by the mask 36. In particular, this makes it possible to transmit the return force on the driven surface and the driving surface directly from one to the other.

In the embodiment in which the toothed wheel sector 11 forms an arm, that arm can more particularly be aligned with the flexing direction F. The return force generated by the flexibility of the mask 30 and the return force generated by the leaf springs 90 are therefore transmitted much more efficiently to the adjuster screw 60 and to the articulation of the lens 1, respectively.

The elastic means are not limited to the leaf springs described. They may take the form of leaf springs made of other materials and having other shapes or consist of rubber or resilient foam components.

Figure 11:
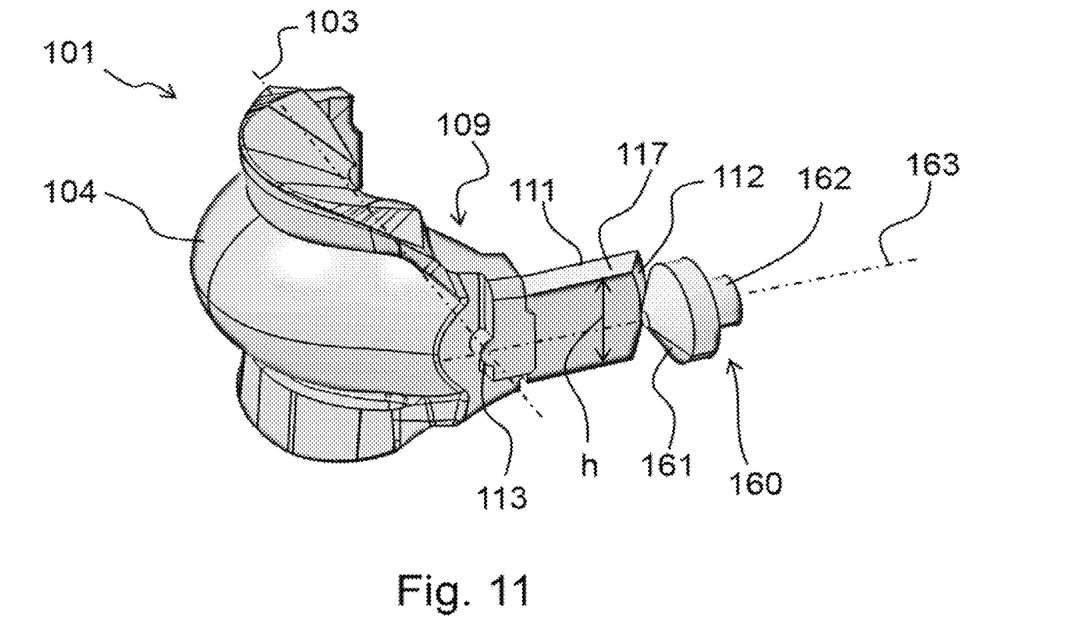
FIG. 11 is a perspective view of part of another embodiment of a lighting device.
Figure 12:
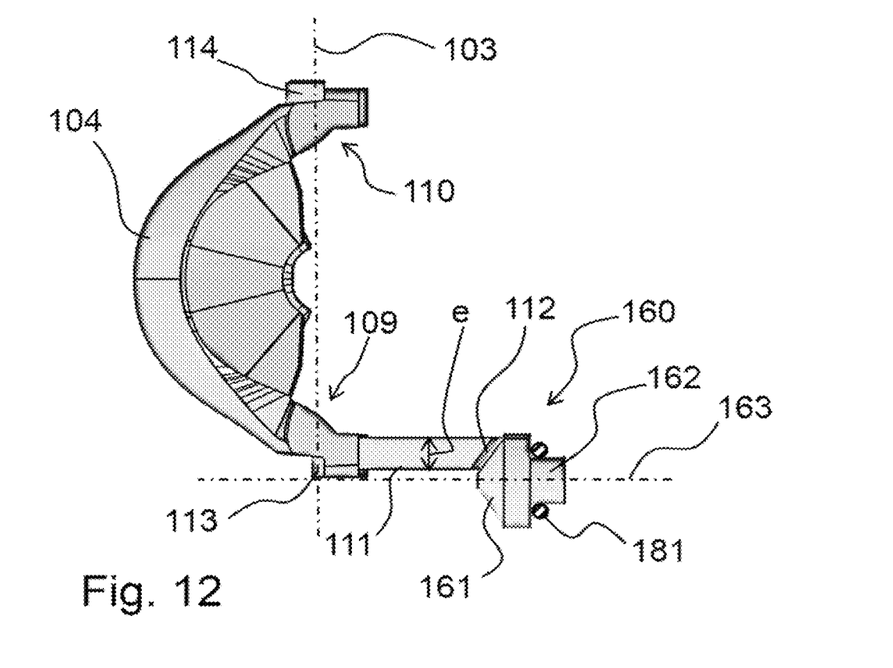
FIG. 12 is a top view of FIG. 11.

FIGS. 11 and 12 show a second embodiment. This is a variant of the first embodiment.

The mask, the closing outer lens and the support of the LED are not shown as they are identical to those of the first embodiment.

The lens 101 comprises an optical part 104 identical to the optical part 4 of the lens 1 of the first embodiment. This lens 101 also comprises a first mobile articulation part 109 and a second mobile articulation part 110. These mobile articulation parts 109 and 110 each comprise a cylindrical portion 113, 114. The latter are arranged with the LED support and the mask in the same manner as in the first embodiment. That arrangement is therefore not described here.

In this example, the second mobile articulation part 110 is moreover identical to the second mobile articulation part 10 of the lens 1 of the first embodiment.

The first mobile articulation part 109 of the lens 101 of the second embodiment differs from that of the lens 1 of the first embodiment. In fact, this lens 101 also comprises a toothed wheel sector 111 but the latter is different from the toothed wheel sector 11 of the first embodiment.

In this second embodiment, the toothed wheel sector 111 is a conical toothed wheel sector with axis 103 coinciding with the rotation axis 103 of the lens 101. In other words, the driven surface 112 formed by the edge surface of this toothed wheel sector 111 is oblique to a direction parallel to the rotation axis 103 of the lens 101.

Here this toothed wheel sector 111 cooperates with a conical toothed wheel 160 that forms a gear 160 for driving this toothed wheel sector 111. This gear 160 comprises a driving surface 161 formed by teeth that are not shown in these figures. These teeth are oblique to the rotation axis 163 of the gear 160.

The toothed wheel sector 111 and the gear 160 therefore mesh with non-parallel axes, notably concurrent axes here.

In this example, the rotation axis 103 of the lens 101 is more particularly perpendicular to the rotation axis 163 of the gear 160.

The device therefore offers direct access from behind to drive the toothed wheel sector 111 and therefore to adjust the position of the lens.

To this end the gear 160 comprises to the rear of its teeth an actuating cylinder 162 that ends, on the right in FIG. 12, in an imprint that is not shown and is adapted to cooperate with a tool or automatic actuating means. This actuating cylinder 162 passes through the casing of the device, which is not shown here. A seal 181 is provided that is adapted to be compressed between the casing and the edge of the gear 160 carrying the teeth.

In this second embodiment, the toothed wheel sector 111 also forms an arm extending lengthwise and from front to rear between the first mobile articulation part 109 and the teeth 112 of the toothed wheel sector 111. As in the first embodiment, the forces transmitted by the mask to press the lens against its support but also to be able to urge the latter toward the gear 160 are therefore transmitted directly by this arm.

The arm extends over a length greater than its thickness "e" so as to have some elasticity transversely to its length. The lens can be mounted so that the arm formed by the toothed wheel sector 111 is prestressed against the gear 160, the direction of this prestressing being parallel to the rotation axis 103 of the lens and toward the center of the lighting device, namely upward in FIG. 12. This enables this prestressing to exert a transverse return force on the teeth 112 of the toothed wheel sector 111 toward the teeth 161 of the gear 160. The play between the gear 160 and the toothed wheel sector 111 is therefore taken up by virtue of the elasticity of the arm itself.

The present invention is particularly advantageous in the context of a fog lamp. However, it could be applied to other lighting devices.

For example, it could be applied to lighting devices with a lens rotating about a vertical axis to produce a mobile part of a light beam, notably a first beam with an oblique or vertical cut-off line, this first beam being intended to be combined with a beam having a horizontal cut-off line.

According to one embodiment of the invention, this combination may be applied to a lighting device in accordance with the invention for generating an elementary light beam with an oblique or vertical cut-off intended to be combined with a second elementary beam with the cut-off line horizontal. The beam with the oblique cutoff being moved horizontally by actuation of the optical component, for example as a function of turns negotiated by the vehicle equipped with the lighting device or again as a function of vehicles approaching in the opposite direction.

The invention claimed is:

1. A vehicle lighting device comprising:
   a lens intended to deflect the light rays emitted by a light source;
   a wheel sector comprising a driven surface, the wheel sector being made in one piece with the lens as a whole, the lens further comprising a deflection part, the wheel sector forming an arm extending lengthwise, its length being aligned with a flexing direction between a first end connected to the deflection part and a free, second end of the length including the driven surface; and
   a driving means with a driving surface such that the driving surface is in contact with the driven surface and movement of the driving surface drives movement of the lens
   wherein each of the driven surface and the driving surface comprises raised patterns,
   wherein the raised patterns of the driven surface are raised in a plane parallel to the flexing direction, and
   wherein the raised patterns of the driven surface and the raised patterns of the driving surface engage one another in the flexing direction.

2. The device according to claim 1, wherein the wheel sector is a toothed wheel sector, the raised patterns of the driven surface being teeth, wherein the arm has two flat surfaces in the flexing direction and an edge surface at the second end of the length, the teeth being arranged on the edge surface.

3. The device according to claim 1, wherein said movement of the lens is a movement of rotation about a rotation axis, the wheel sector being centered on the rotation axis of the lens.

4. The device according to claim 1, wherein the lens is formed in one piece from a transparent or translucent material, this material being polymethyl methacrylate.

5. The device according to claim 1, wherein the driven surface carries helicoidal teeth.

6. The device according to claim 1, wherein the adjuster screw extends along a longitudinal axis and comprises a carrier portion, said carrier portion being situated on one side of the threaded portion along the longitudinal axis, said device further comprising:
   a wall cooperating with the adjuster screw,
   one or more elastic means arranged between said carrier portion and said cooperating wall and adapted to be compressed in a direction transverse to the longitudinal axis of the adjuster screw, the lens, the cooperating wall and the elastic means being such that the elastic means or at least one of the elastic means is loaded to exert a return force to urge the threaded portion toward the lens and in which the wheel sector forms an arm, the force returning the threaded portion toward the lens being aligned with the direction in which this arm extends.

7. The device according to claim 1, comprising a casing wherein the lens and the adjuster screw are housed inside the casing, and wherein the casing comprises:
   a front housing closed at the front by a closing outer lens, the lens being mounted inside this front housing,
   a cassette with the threaded portion inside it,
   a sleeve connecting the front housing and the cassette, the wheel sector forming an arm extending lengthwise through the sleeve into the cassette, where the driven surface is in contact with the driving surface.

8. The device according to claim 7, wherein the cassette has an interior wall formed by a cylinder portion of a given diameter, the sleeve having an inside width in a transverse direction less than this given diameter and greater than the thickness of the wheel sector.

9. The device according to claim 7, wherein the sleeve opens into the cassette via an opening delimited by a chamfer oriented toward the interior of the sleeve.

10. A vehicle lighting device comprising:
    a lens intended to deflect the light rays emitted by a light source, the lens having a rotation axis;
    a wheel sector comprising a driven surface, the wheel sector being made in one piece with the lens as a whole; and
    a driving means with a driving surface such that the driving surface is in contact with the driven surface and movement of the driving surface drives movement of the lens,
    wherein the wheel sector includes a conical wheel sector pivoting with respect to the rotation axis of the lens, and in which the driving means is a conical wheel that drives the conical wheel sector such that a longitudinal axis of the conical wheel sector moves between being parallel to being non-parallel to a rotation axis of the conical wheel, and
    wherein the driven surface is oblique relative to a direction of the rotation axis of the lens.

11. The device according to claim 10, wherein the wheel sector forms an arm having an elasticity in a direction parallel to the rotation axis of the conical wheel, the arm and the conical wheel being such that the arm is loaded so as to exert a return force to urge the driven surface toward the driving surface.

12. The device according to claim 1, said device also comprising:
 a pressing assembly comprising an armature and a contact portion carried by the armature, the armature surrounding the lens at least partly, said contact portion bearing against the lens, the lens, the driving means and said pressing assembly being such that the lens is at least partially clamped between the adjuster screw and said contact portion and in a direction going from the adjuster screw towards said contact portion, termed the flexing direction, said contact portion is rigid and the armature is elastically deformable.

13. The device according to claim 1, wherein said movement of the lens is a movement of rotation about a rotation axis, the wheel sector being centered on the rotation axis of the lens.

14. The device according to claim 6, comprising a casing, wherein the lens and the adjuster screw are housed inside the casing, and wherein the casing comprises:
 a front housing closed at the front by a closing outer lens, the lens being mounted inside this front housing,
 a cassette with the threaded portion inside it,
 a sleeve connecting the front housing and the cassette, the wheel sector forming an arm extending lengthwise through the sleeve into the cassette, where the driven surface is in contact with the driving surface.

\* \* \* \* \*